2,848,477

PROCESS FOR PREPARING LOW MOLECULAR WEIGHT OMEGA-CHLORONITRILES FROM CYANOGEN CHLORIDE AND ETHYLENE

William L. Kohlhase, Wilmington, Del., assignor to E. I. du Pont de Nemours and Company, Wilmington, Del., a corporation of Delaware No Drawing. Application October 31, 1956
Serial No. 619,398

4 Claims. (Cl. 260—465.3)

This invention relates to a chemical process for preparing omega-chloronitriles of the formula $$Cl(CH_2CH_2)_nCN$$

wherein $n$ is an integer, and is more particularly concerned with the production of low molecular weight chloronitriles of the above type by a free-radical-initiated reaction of liquid cyanogen chloride with ethylene under superatmospheric pressure.

It has been found that a reaction can be initiated between cyanogen chloride vapor and ethylene to produce a mixture of straight-chain omega-chloronitriles of the formula, $Cl(CH_2CH_2)_nCN$, wherein $n$ is an integer. These mixtures have previously included a broad range of molecular weights. For example, when cyanogen chloride vapor and 1.25% of its weight of azo-bis-isobutyronitrile were passed continuously through a reaction tube maintained at a temperature of 160–170° C. and at a pressure of 1910 lbs./sq. in. by introducing ethylene, using a reaction tube having a metal packing of woven wire network to provide uniform conditions, the cyanogen chloride vapor and ethylene reacted to produce a mixture of products which included 8.6% beta-chloropropionitrile, 23.4% delta-chlorovaleronitrile, 21.1% omega-chloroenanthonitrile, 16.0% omega-chloropelargononitrile, and 5.4% omega-chloroundecanonitrile, the remainder being higher molecular weight materials. Such a wide variety of products is undesirable because only a low proportion of economically useful products is obtained and these must be separated from the other materials.

A reaction of the above type has become known as a telomerization and the products are called telomers. A free-radical-forming polymerization catalyst of one of the well-known types, e. g., an organic peroxide or aliphatic azo compound, is required as illustrated in the above telomerization. Since the catalyst is decomposed during the reaction, it is more appropriately referred to as telomerization initiator. These terms will be used hereinafter.

It is an object of this invention to provide a process for telomerizing cyanogen chloride and ethylene to produce a high proportion of omega-chloronitrile telomers of low molecular weight. Another object is to provide such a process for producing telomers containing a high proportion of delta-chlorovaleronitrile. A further object is to provide such a process for producing telomers containing a high proportion of beta-chloropropionitrile. A still further object is to provide a telomerization process which produces these products relatively free from the higher molecular weight materials containing seven or more carbon atoms. Other objects will become apparent from the specification and claims.

In accordance with the process of the present invention, ethylene under superatmospheric pressure is reacted with liquid cyanogen chloride in the presence of a telomerization initiator under conditions which substantially eliminate vapor phase reactions, or at least subordinate any vapor phase reactions to the liquid phase reaction. Suitable process conditions are accomplished by providing a reaction space which is only 1 to 2 times the liquid volume of the cyanogen chloride present during the telomerization, so that only a minor amount of cyanogen chloride can vaporize; or by introducing liquid cyanogen chloride reactant containing the telomerization initiator into a vapor phase of the ethylene reactant which has previously been saturated with initiator-free cyanogen chloride at the reaction temperature and pressure, so that initiation of telomerization in the vapor phase will be minor in comparison to that in the liquid cyanogen chloride.

By this process the percentage of delta-chlorovaleronitrile in the telomers can be increased to about twice the amount obtained in the vapor phase reaction noted previously, and an even greater increase in the percentage of beta-chloropropionitrile can be obtained. The higher molecular weight telomers are greatly reduced in amount, and can even be substantially eliminated, depending upon the extent to which vapor phase reactions are avoided under the particular operating conditions employed.

Cyanogen chloride is extremely volatile, boiling at 15° C., and the liquid cyanogen chloride introduced for reaction with ethylene is substantially all vaporized before the reaction temperature is reached if the reactor space is more than about four times the liquid volume of the cyanogen chloride charge. However, the vaporization can be limited by using a reaction space which is from one to two times the liquid volume of the cyanogen chloride. In this way a minor vapor phase of ethylene substantially saturated with cyanogen chloride and a major liquid phase of cyanogen chloride substantially saturated with ethylene can be provided at the reaction conditions, and the weight of liquid cyanogen chloride will be greater than that in the vapor by at least two to one under usual operating conditions.

The relative proportion of the low molecular weight telomers, beta-chloropropionitrile and delta-chlorovaleronitrile, has been found to increase as the proportion of telomers formed in the liquid phase is increased relative to vapor phase reactions, and the relative proportions of these telomers can be controlled by selection of the reaction space within the above limits. The telomerization gives the most favorable results when the ethylene concentration in the liquid phase is maintained at or near the saturation level by thorough agitation of the reaction mixture or other suitable means.

The optimum conditions of temperature and concentration of initiator will depend on the particular initiator used. Suitable conditions for batch operation are obtained with di-tertiary-butyl peroxide as the initiator by operation in the temperature range of 130–165° C.; over this range the half-life of the peroxide drops from about seven hours to about 10 minutes. Similar reaction rates are obtained with azo-bis-isobutyronitrile at 65–95° C., and with azo-bis-cyclohexanecarbonitrile at 90–120° C. Di-tertiary-butyl peroxide concentrations of 0.1–3. percent by weight give a reasonably slow rate of reaction at 160° C. Other concentration ranges would be available at other temperatures and would depend upon the rate of decomposition of the peroxide at that temperature. Other initiators of various types would each have certain conditions of temperature and/or concentration which would bring about the desired rate of telomerization.

A homogeneous mixture of the initiator and the cyanogen chloride reactant is prepared at a temperature well below the boiling point of the cyanogen chloride in preparation for the reaction with ethylene. In a batch process the reactor will usually be charged with this liquid reactant mixture first and then be pressured with ethylene and heated to the operating temperature. However, the reactor can first be charged with ethylene saturated with cyanogen chloride at the reaction temperature and pressure, but containing no initiator, followed by introduction of the liquid mixture of cyanogen chloride and initiator under pressure. The latter procedure is more complicated but has the advantage of providing closer control of the reaction conditions. In a continuous operation, a reaction tube or column is maintained at the desired reaction temperature, the tube is connected to a source of ethylene at the reaction pressure, the liquid mixture of cyanogen chloride and initiator is continuously introduced into one end of the tube at a rate which will provide the required reaction time within the tube, and reaction products and excess unreacted cyanogen chloride are withdrawn from the other end of the tube at a rate which will maintain a constant amount of liquid in the tube. As in the batch process, vapor phase reactions are substantially avoided by providing a reaction space which is 1 to 2 times the liquid volume present during the reaction, or by saturating the ethylene with cyanogen chloride containing no initiator before the ethylene is contacted with the mixture of liquid reactant and initiator. Suitable means for mixing the liquid with the ethylene during passage through the tube should be provided in accordance with good engineering practice.

The most useful reaction pressures are from about 750 to 10,000 lbs./sq. in. Satisfactory results can be obtained at 1000–2000 lbs./sq. in., and this moderate pressure range is generally preferable. The desired pressure is readily maintained by connecting the reactor to a source of ethylene at that pressure.

The invention will be better understood by considering the following examples. Example 1 is included to show the results obtained in a batch reaction in which the cyanogen chloride reactant was all vaporized, for comparison with the subsequent examples illustrating specific embodiments of the invention. Examples 2, 3 and 4 illustrate embodiments in which reaction spaces of 1.6 and 1.3 times the liquid volume of the cyanogen chloride reactant are used to provide a weight ratio of at least 4 parts liquid cyanogen chloride to 1 part cyanogen chloride vapor. Example 5 illustrates the modification in which the ethylene is first saturated with cyanogen chloride containing no initiator in order to suppress vapor phase reactions during a subsequent slow injection of liquid cyanogen chloride containing the initiator. Example 6 illustrates a specific embodiment of the invention which differs from Examples 2 to 4 in the initiator, concentration of initiator, temperature, pressure and reaction space. In this example a reaction space of twice the liquid volume of the cyanogen chloride was used to provide a liquid to vapor weight ratio of about 2 to 1. It might be thought that part of the cyanogen chloride could be replaced with a less volatile inert solvent to produce similar results. Such a comparison is made in Table II.

EXAMPLE 1

A solution of 1.17 g. of di-tertiary-butyl peroxide in 50 cc. (58 g.) of liquid cyanogen chloride (at 0° C.) was added to a cold 325-cc. silver-lined shaker tube capable of withstanding high pressures. The tube was previously purged three times with nitrogen, evacuated to about 0.5 mm. of mercury absolute pressure, and then cooled in a mixture of ice and water. The tube was then placed in a pendulum-type shaking machine and connected to a pressure gauge and a source of dry ethylene under pressure. Sufficient ethylene was then added to the tube at 20° C. to bring the total pressure up to about 600 lbs./sq. in. The tube was then continuously agitated at the rate of one stroke/second while being heated at a uniform rate to a temperature of 160° C. A period of 15 min. was required for the heating. The temperature was then kept at 160° C. for a period of 85 min. while agitation was maintained; the pressure was held at about 2000 lbs./sq. in. by the addition of more ethylene as required. In one experiment carried out under these conditions the total drop in pressure during the reaction was 400 lbs./sq. in. In another identical run it was 200 lbs./sq. in. At the end of the reaction the tube was cooled to 0° C., and the unreacted ethylene was slowly bled off. The mixture of ω-chloronitriles and unreacted cyanogen chloride left in the tube was then poured out; this material weighed 95.7 g. Unreacted cyanogen chloride was then distilled from this mixture by heating to about 90° C. at atmospheric pressure. The weight of the crude product remaining was 74.4 g.; in another identical run it was 76.6 g. The crude product mixture was then centrifuged to remove traces of solid by-products, and the clear brown liquid was rapidly distilled through a heated one-foot spinning band column under reduced pressure. Traces of unreacted cyanogen chloride and some low-boiling by-products were taken over at 10 mm. Hg (abs.). The pressure was then gradually reduced to 1 mm. Hg (abs.) while the still pot was heated to a temperature of 250° C. The maximum vapor temperature was 150° C.; the proportion of each chloronitrile in the mixture of distilled products was then measured by vapor-phase partition chromatography using a column packed with "Celite" diatomaceous earth coated with a silicone-type high vacuum grease. The proportion of the products obtained from the two identical runs is shown in Table I.

EXAMPLE 2

The procedure of Example 1 was followed with a shaker tube charge of 200 cc. of liquid cyanogen chloride and 2.34 g. of di-tertiary-butyl peroxide. The total pressure was brought up to 300 lbs./sq. in. at 20° C. by adding ethylene before the mixture was heated to 160° C. Additional ethylene was added as needed to maintain a pressure of 2000 lbs./sq. in. at 160° C. The proportion of products obtained is shown in Table I.

EXAMPLE 3

Example 2 was repeated using 4.86 g. of di-tertiary-butyl peroxide. The proportion of products obtained is shown in Table I.

EXAMPLE 4

The procedure of Example 1 was followed in duplicate runs with a shaker tube charge of 250 cc. of cyanogen chloride, 2.34 g. of di-tertiary-butyl peroxide and sufficient ethylene to give a total pressure at 20° C. of about 150 lbs./sq. in. The proportion of telomers obtained in each run is shown in Table I.

Table I.—*Effect of reaction space on products obtained by telomerization of cyanogen chloride and ethylene at 160° C. and 2000 lbs./sq. in. using di-tertiary-butyl peroxide initiator*

| Example No. | Relative Volume Reactor/Liquid Volume of CNCl Present | Proportion of ω-Chloronitrile of Indicated No. of Carbons (Percent by weight) | | | | | |
|---|---|---|---|---|---|---|---|
| | | $C_3$ | $C_5$ | $C_7$ | $C_9$ | $C_{11}$ | Tars [1] |
| 1 | 6.5/1 | 5.9 | 29.2 | 26.4 | 15.7 | 8.1 | 14.7 |
| 1 | 6.5/1 | 5.9 | 30.2 | 25.0 | 15.8 | 8.3 | 14.8 |
| 2 | 1.6/1 | 40.0 | 43.1 | 4.6 | Negligible | | 12.3 |
| 3 | 1.6/1 | 44.3 | 40.3 | 3.9 | Negligible | | 11.5 |
| 4 | 1.3/1 | 66.2 | 22.9 | 1.5 | Negligible | | 9.4 |
| 4 | 1.3/1 | 64.7 | 27.4 | 0.9 | Negligible | | 7.0 |

[1] These are believed to be polymers formed by side reactions.

EXAMPLE 5

The equipment described in Example 1 was modified so that a solution of di-tertiary-butyl peroxide in cyanogen chloride could be injected into the shaker tube while it was being shaken under ethylene pressure at elevated temperatures. The shaker tube was charged with 50 cc. of liquid cyanogen chloride and placed in the pendulum-type shaking machine as described in Example 1. The cyanogen chloride was heated to 140° C., and then sufficient ethylene was added to bring the total pressure to 1000 lbs./sq. in. The temperature was held at 140° C. while the tube was shaken at a rate of one stroke/sec. and a solution of 8 g. of the peroxide in 170 cc. of liquid cyanogen chloride was injected in 0.5 hour at a uniform rate. After completion of the injection the contents of the tube was maintained at 140° C. and 1000 lbs./sq. in. for one hour. The remainder of the procedure was as in Example I and the proportion of each chloronitrile was found to be as follows:

| | Percent by weight |
|---|---|
| Beta-chloropropionitrile ($C_3$) | 24 |
| Delta-chlorovaleronitrile ($C_5$) | 62 |
| Omega-chloroenanthonitrile ($C_7$) | 11 |
| Higher molecular weights | 3 |

EXAMPLE 6

A 325 cc., silver-lined shaker tube, capable of withstanding high pressures, was purged three times with nitrogen, evacuated to about 0.5 mm. of mercury absolute pressure, and then cooled in a mixture of ice and water. The tube was charged with 160 cc. (187 g.) of liquid cyanogen chloride (at 0° C.) containing 0.95 g. of azo-bis-isobutyronitrile. The tube was then placed in a pendulum-type shaking machine and connected to a pressure gauge and a source of dry ethylene under pressure. Sufficient ethylene was then added to the tube at about 25° C. to bring the total pressure up to about 700 lbs./sq. in. The tube was then continuously agitated at the rate of one stroke/second while being heated at a uniform rate to a temperature of 100° C. A period of 20 min. was required for the heating. The temperature was then kept at 100° C. for a period of 65 min. while agitation was maintained; the pressure was held at about 5000 lbs./sq. in. by the addition of more ethylene as required. The reaction temperature was finally raised to 120° C. for 35 minutes. The tube was then cooled to 0° C. and the unreacted ethylene was slowly bled off. The analysis of the telomers obtained is shown in Table II. Table II also shows the proportion of chloronitrile telomers obtained when one-half of the cyanogen chloride was replaced with benzene in a similar run. The results in this case differed only slightly from the proportion of telomers obtained in another run like Example 6 except that 100 cc. of cyanogen chloride was used. A comparison of the results shown in Table II indicates that decreasing the vapor space by adding a solvent does not achieve the unexpected advantages of this invention.

Table II.—*Effect of reaction space on products obtained by telomerization of cyanogen chloride and ethylene as in Example 6 using azo-bis-isobutyronitrile initiator*

| Relative Volume Reactor/Liquid Volume Charged | Proportion of ω-Chloronitrile of Indicated No. of Carbons (Percent by Weight) | | | | |
|---|---|---|---|---|---|
| | $C_3$ | $C_5$ | $C_7$ | $C_9$ | Higher |
| 2/1 CNCl | 11 | 43.0 | 27.1 | 11.3 | 8 |
| 2/1 CNCl:benzene (1:1) | 3 | 21.5 | 22.2 | 20.2 | 28 |
| 3.2/1 CNCl | 9 | 27.5 | 25.0 | 16.0 | 21 |

When interpreting the results obtained by the procedures of the examples it should be understood that other combinations of temperature and pressure will modify the results; also the use of other initiators will generally have some effect upon the results obtained. However, for any given set of conditions, the proportion of the low molecular weight chloronitriles obtained from the telomerization of ethylene and cyanogen chloride can be greatly increased in the manner taught.

The examples have illustrated batch operation, but the process is readily adapted to continuous operation. For example, in order to obtain the maximum concentration of low molecular weight telomers with a continuous reactor, a stirred autoclave or tubular reactor should be selected which will handle the required throughput with substantially no vapor phase present. If a stirred autoclave having a suitable pressure relief device is used it can be operated completely full by dissolving the ethylene reactant in the cool liquid cyanogen chloride fed to the autoclave. The same technique is applicable when using a tubular reactor. Alternatively, the autoclave or tubular reactor can be operated with a separate ethylene feed by introducing a stream of ethylene of such size that it is substantially all absorbed before vapor phase reactions occur. Solution of ethylene is facilitated by breaking up the gas flow through a system of baffles or by packing material.

Since many different embodiments of the invention may be made without departing from the spirit and scope thereof, it is to be understood that the invention is not limited by the specific illustrations except to the extent defined in the following claims.

What is claimed is:

1. The process for preparing omega-chloronitriles of the formula $Cl(CH_2CH_2)_nCN$, wherein $n$ is an integer, which comprises reacting ethylene under superatmospheric pressure with liquid cyanogen chloride containing a telomerization initiator, the weight of cyanogen chloride liquid present in the reaction space being at least two times the weight of any cyanogen chloride vapor present to produce a mixture of omega-chloronitriles in which the total of beta-chloropropionitrile plus delta-chlorovaleronitrile is a major proportion of the mixture, and separating the resulting chloronitriles from the reaction mixture.

2. The process for preparing omega-chloronitriles of the formula $Cl(CH_2CH_2)_nCN$, wherein $n$ is an integer, which comprises reacting ethylene under superatmospheric pressure with liquid cyanogen chloride containing a telomerization initiator in a reaction space which is 1 to 2 times the liquid volume of the cyanogen chloride present to produce a mixture of omega-chloronitriles in which the total of beta-chloropropionitrile plus delta-chlorovaleronitrile is a major proportion of the mixture, and separating the resulting chloronitriles from the reaction mixture.

3. The process for preparing omega-chloronitriles of the formula $Cl(CH_2CH_2)_nCN$, wherein $n$ is an integer, which comprises reacting ethylene under superatmospheric pressure with liquid cyanogen chloride containing a telomerization initiator, the ethylene having previously been saturated with initiator-free cyanogen choride to prevent vaporization of the liquid cyanogen chloride reactant, to produce a mixture of omega-chloronitriles in which the total of beta-chloropropionitrile plus delta-chlorovaleronitrile is a major proportion of the mixture, and separating the resulting chloronitriles from the reaction mixture.

4. The process for preparing omega-chloronitrile telomers of the formula $Cl(CH_2CH_2)_nCN$, wherein $n$ is an integer, which comprises dissolving ethylene in cold liquid cyanogen chloride containing a telomerization initiator, raising the temperature of the liquid in a reaction space which is 1 to 2 times the volume of the liquid and is maintained under an ethylene pressure of 750 to 10,000 lbs./sq. in. until the ethylene and cyanogen chloride react to produce a mixture of omega-chloronitriles in which the total of beta-chloproprionitrile plus delta-chlorovaleronitrile is a major proportion of the mixture, and then separating the telomers from the reaction mixture.

References Cited in the file of this patent

UNITED STATES PATENTS

| 2,653,963 | Cowen et al. | Sept. 29, 1953 |
| 2,745,864 | Dixon | May 15, 1956 |

FOREIGN PATENTS

| 1,096,992 | France | Feb. 9, 1955 |